United States Patent
Cho (10) Patent No.: US 12,533,819 B2
(45) Date of Patent: Jan. 27, 2026

(54) VACUUM SUCTION PAD AND VACUUM GRIPPER HAVING THE SAME

(71) Applicant: VTEC CO., LTD., Busan (KR)

(72) Inventor: Ho-Young Cho, Seoul (KR)

(73) Assignee: VTEC CO., LTD., Busan (KR)

( * ) Notice: Subject to any disclaimer, the term of this patent is extended or adjusted under 35 U.S.C. 154(b) by 889 days.

(21) Appl. No.: 17/808,359

(22) Filed: Jun. 23, 2022

(65) Prior Publication Data

US 2023/0271335 A1 Aug. 31, 2023

(30) Foreign Application Priority Data

Feb. 25, 2022 (KR) .................. 10-2022-0024853

(51) Int. Cl.
*B25J 15/06* (2006.01)
(52) U.S. Cl.
CPC .................. *B25J 15/0625* (2013.01)
(58) Field of Classification Search
CPC ... B25J 15/0625; B25J 15/065; B25J 15/0616
USPC ........................................................ 294/188
See application file for complete search history.

(56) References Cited

U.S. PATENT DOCUMENTS

| | | | |
|---|---|---|---|
| 4,763,941 A * | 8/1988 | Sniderman | H01L 21/6838 271/103 |
| 5,029,383 A | 7/1991 | Snyder et al. | |
| 5,544,968 A | 8/1996 | Goellner | |
| 5,611,258 A | 3/1997 | Matuo et al. | |
| 6,024,392 A | 2/2000 | Blatt | |
| 6,213,521 B1 * | 4/2001 | Land | F16L 37/244 285/361 |
| 6,454,333 B2 | 9/2002 | Portal | |
| 6,502,877 B2 | 1/2003 | Schick et al. | |
| 7,281,739 B2 | 10/2007 | Kniss | |
| 7,665,783 B2 | 2/2010 | Nishio | |
| 8,113,560 B2 | 2/2012 | Sone | |
| 9,399,297 B2 | 7/2016 | Cho | |
| 11,091,355 B1 * | 8/2021 | Lilliston, III | B25B 11/005 |
| 11,325,266 B1 * | 5/2022 | Rodgers | B25J 13/087 |
| 12,186,893 B2 * | 1/2025 | Song | B25J 15/0691 |
| 2015/0093262 A1 * | 4/2015 | Cho | F04F 5/14 417/151 |

(Continued)

FOREIGN PATENT DOCUMENTS

| | | |
|---|---|---|
| JP | 2011110674 A | 6/2011 |
| JP | 2014200853 A | 10/2014 |

(Continued)

*Primary Examiner* — Paul T Chin
(74) *Attorney, Agent, or Firm* — INNOVATION CAPITAL LAW GROUP, LLP; Vic Lin (57) ABSTRACT

The present invention relates to a vacuum suction pad applied to a vacuum transfer system. The vacuum suction pad has a structure in which a plurality of suction cells are formed by flexible partition walls. The vacuum suction pad includes a coil spring that is coaxially installed at a central portion in a longitudinal direction in each of the suction cells and spaced a distance from the partition wall and a pipeline flow control valve coupled to a lower end of the spring. The suction pad is coupled with a separately provided body to constitute a vacuum gripper of the present invention, and the gripper is connected to a vacuum pump through an exhaust port defined at one side of the body.

8 Claims, 8 Drawing Sheets

(56) References Cited

U.S. PATENT DOCUMENTS

2025/0108519 A1* 4/2025 Yamamoto ........... B25J 15/0616

FOREIGN PATENT DOCUMENTS

| KR | 100934704 | B1 | 12/2009 |
| KR | 101019948 | B1 | 3/2011 |
| KR | 101078409 | B1 | 10/2011 |
| KR | 101597975 | B1 | 2/2016 |
| KR | 1020160042508 | A | 4/2016 |
| KR | 102252435 | B1 | 5/2021 |
| KR | 102291521 | B1 | 8/2021 |

* cited by examiner

VACUUM SUCTION PAD AND VACUUM GRIPPER HAVING THE SAME

TECHNICAL FIELD

The present invention relates to a vacuum suction pad and a vacuum gripper, which are used in a vacuum transfer system to grip a target object.

BACKGROUND ART

In general, a vacuum transfer system represents a system that forcedly discharges inner air of a 'suction pad' by using a vacuum pump activated by high-speed compressed air to suction and grip a product by using a vacuum and a negative pressure generated in the pad and then transfer the product to a predetermined position. In this structure, the suction pad is coupled with a separate body to constitute a 'gripper' and connected to a vacuum pump through the body.

The pad may be provided in singularity or plurality according to characteristics of the product. For example, when a surface of the product is wide and curved, in general, a plurality of small-sized pads are arranged on the body. This method is stable in comparison with a case of using a large-sized single pad. However, a feature of installing the plurality of small-sized pads is extremely difficult and inconvenient, and the risk of arbitrary separation of the installed pads is high. Also, since a lot of spaces that are not related to suction of the product exist between the pads, an overall space utilization and a suction efficiency are degraded.

In order to overcome the above-described limitation, Korean Patent Registration Nos. 10-2252435 and 10-2291521 disclose a multi-cell-type flexible suction pad. The pad disclosed in the two patents is formed such that a plurality of suction cells having a suction function are integrated with a flexible partition wall therebetween. The pad includes a partition wall support inserted to each of the cells in order to prevent each cell from being contracted by a negative pressure while suctioning a product. As the partition wall support, the former uses a porous material, and the latter uses a coil spring.

However, the patents have problems as stated below.

First, the flexible partition wall of the cell is easily worn, damaged, and broken by friction caused by repeated contraction and expansion of the support.

Second, the patents do not disclose a technical concept and a measure for a case when vacuum leakage is generated at a lower end of the partition wall of each of the cells.

As a result, stability and efficiency of product suction of the suction pad in the vacuum transfer system may not be reliable.

TECHNICAL DOCUMENTS OF RELATED ART

Korean Patent Registration No. 10-1019948
Korean Patent Registration No. 10-2016-0042508
Korean Patent Registration No. 10-2252435
Korean Patent Registration No. 10-2291521

DISCLOSURE OF THE INVENTION

Technical Problem

The present invention provides a vacuum suction pad capable of improving durability of a suction pad and stability and efficiency of suction to a target product and a vacuum gripper including the same in order to solve the above-described problems of the related art.

Technical Solution

The present invention provides a vacuum suction pad in which a plurality of suction cells are consecutively disposed with a flexible partition wall therebetween, the vacuum suction pad including:
 a flexible pad part in which a lower end of the partition wall at an opened side of the suction cell is in contact with a surface of a product;
 a coil spring that is coaxially installed at a central portion in a longitudinal direction in each of the cells and spaced a distance from the partition wall; and
 a pipeline flow control valve coupled to a lower end of the spring and disposed in the suction cell with an air passage defined between the partition wall and the control valve,
 in which a lower portion of a pipeline corresponds to a surface of a product, and
 an inner space of each of the cells communicates with the outside through an exhaust hole disposed above the inner space.

Preferably, the pad part may include a core part integrated on an upper side of the partition wall part including a plurality of partition walls, and an exhaust hole of the suction cell extends through the core part. Also, a stopper configured to support an end of the spring may be installed in the extended hole of the core part.

The control valve may include a small-sized suction pad disposed on an end of the control valve.

In an embodiment of the present invention, a vacuum gripper includes:
 the suction pad; and a body coupled to an upper side of the suction pad. Here, the body includes:
 an inner vacuum chamber configured to communicate with each of the suction cells and the exhaust hole; and
 an exhaust port configured to communicate with the chamber.

Preferably, the body may be coupled with the core part.

Advantageous Effects

The vacuum suction pad of the present invention performs the first-suction caused by the suction cell and the second-suction caused by the control valve in a double manner. Here, since the spring and the partition wall of the cell are spaced a predetermined distance from each other, the spring and the partition wall do not contact each other, and the friction therebetween is not generated. Thus, the durability of the suction pad and the stability and efficiency of the suction to the target product may be remarkably improved. Also, the vacuum gripper of the present invention includes the body coupled with the suction pad, and the body includes the vacuum chamber that communicates with each of the suction cells in a batch manner. Thus, the gripper may have the overall compact configuration.

MODE FOR CARRYING OUT THE INVENTION

A 'vacuum suction pad' (hereinafter, referred to as a 'suction pad') and a 'vacuum gripper' (hereinafter, referred to as a 'gripper') of the present invention, which are described or not described above, will be clarified through embodiments described below with reference to the accompanying drawings. In the drawings, a reference numeral 10 indicates the suction pad, and a reference numeral 50 indicates the gripper.

Referring to FIGS. 1 to 5, a suction pad 10 includes a flexible pad part 20, a coil spring 30, and a control valve 40, and a gripper 50 of the present invention includes the suction pad 10 and a body 60.

Suction Pad 10

The suction pad 10 of the present invention includes the flexible pad part 20 that is organically coupled and the coil spring 30 and the control valve 40, which are disposed in the flexible pad part 20.

The pad part 20 is formed such that a plurality of suction cells 21 are consecutively disposed with a flexible partition wall 22 therebetween. When a product is suctioned, a lower end 22a of the partition wall 22 at an opened side of the cell 21 is in contact with a surface of the product. The pad part 20 is made of silicon or other soft materials providing flexibility of the partition wall 22. Here, the suction cell 21 may have a cross-sectional shape of a hexagon having a so-called honeycomb shape. However, the embodiment of the present invention is not limited thereto. For example, the cross-sectional shape of the suction cell 21 may have a triangular to pentagonal shape or other polygonal shapes. Here, the 'flexibility' represents a property of being deformed, contracted, stretched, and returned to an original state of the partition wall 22.

The spring 30 is a coil spring that is coaxially installed at a central portion in a longitudinal direction in each of the cells 21 and spaced a distance d1 from the partition wall 22. The spring 30 may allow the control valve 40 coupled to a lower end of the spring 30 to flexibly correspond according to a surface shape of a product. Here, the distance d1 may be specifically designed in consideration of features such as a degree of flexibility of the partition wall 22, a space area of the suction cell 21, and elasticity and an outer diameter of the spring 30. The spring 30 may have a coil density that is partially different as necessity as illustrated in the drawings.

Figure 1:
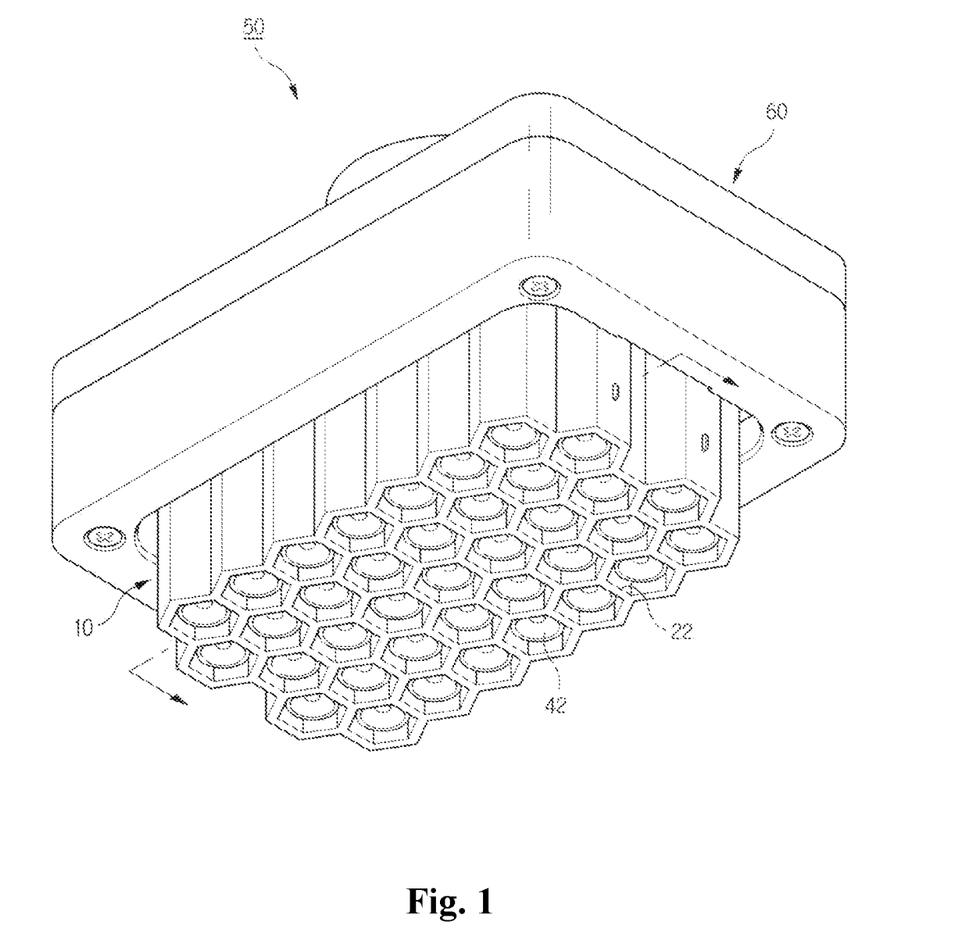
FIG. 1 is a perspective view illustrating a vacuum gripper according to the present invention.
Figure 2:
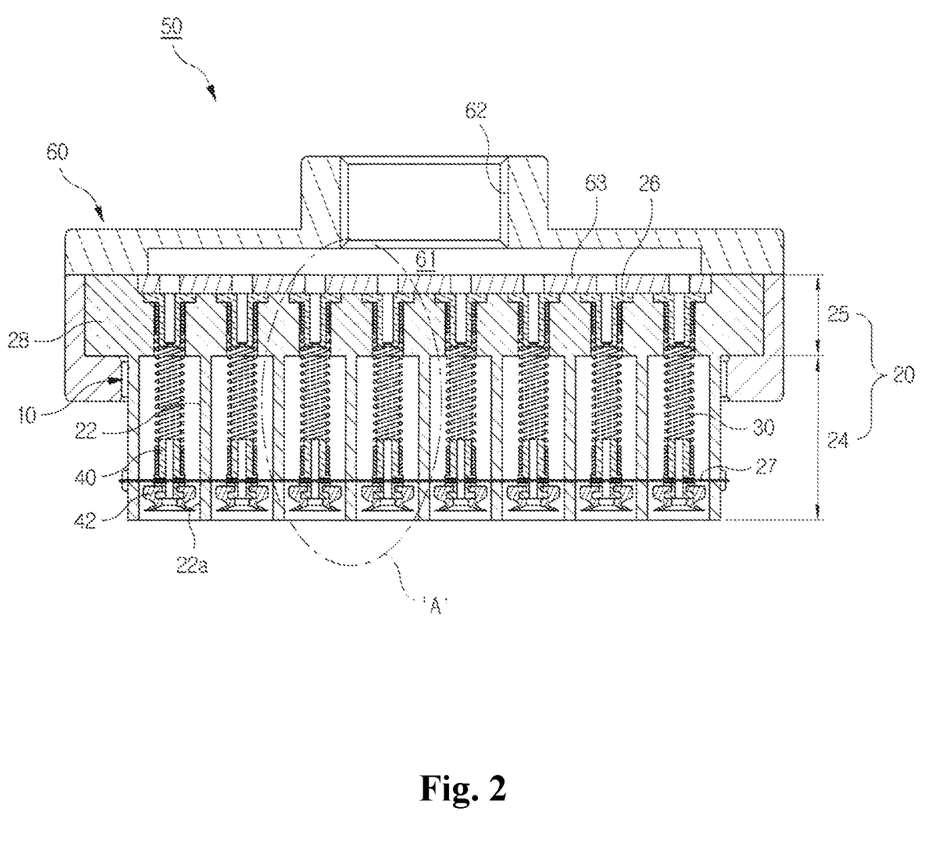
FIG. 2 is a cross-sectional view of FIG. 1.
Figure 3:
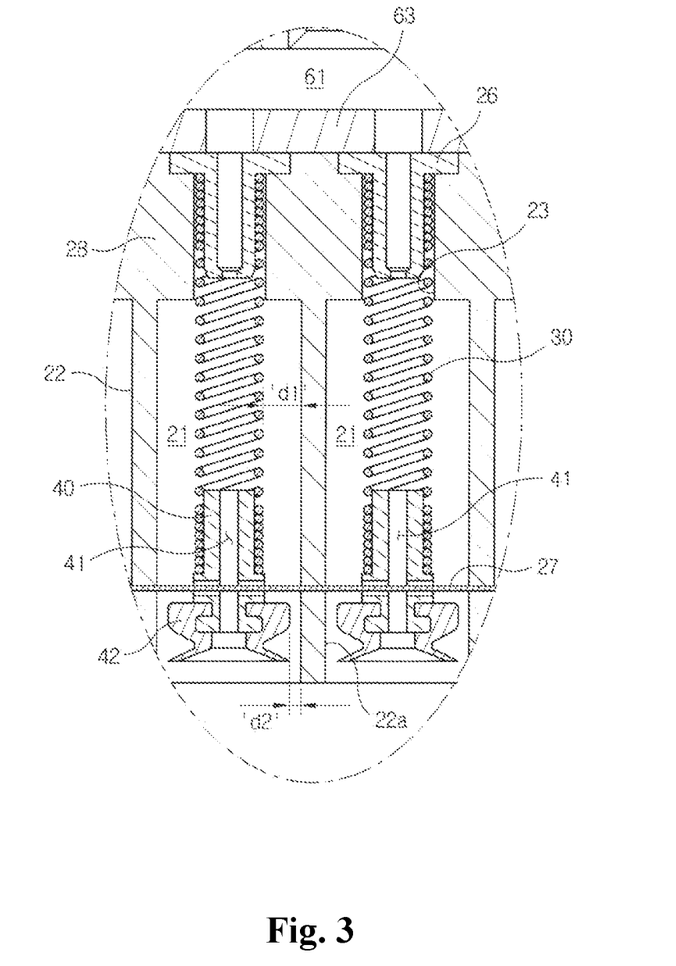
FIG. 3 is an enlarged view illustrating a portion 'A' of FIG. 2.
Figure 4:
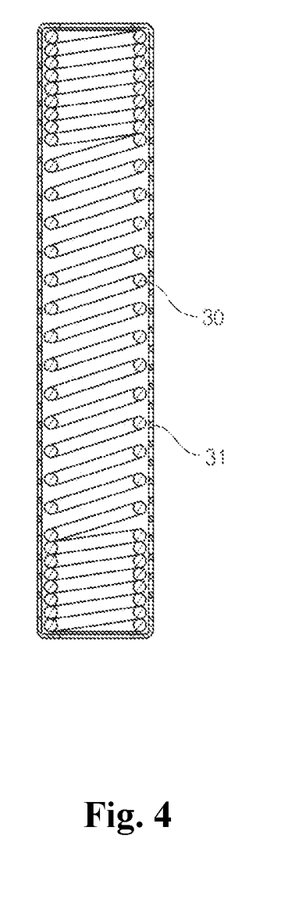
FIG. 4 is a view illustrating another example of a 'spring' applied to FIG. 2.
Figure 5:
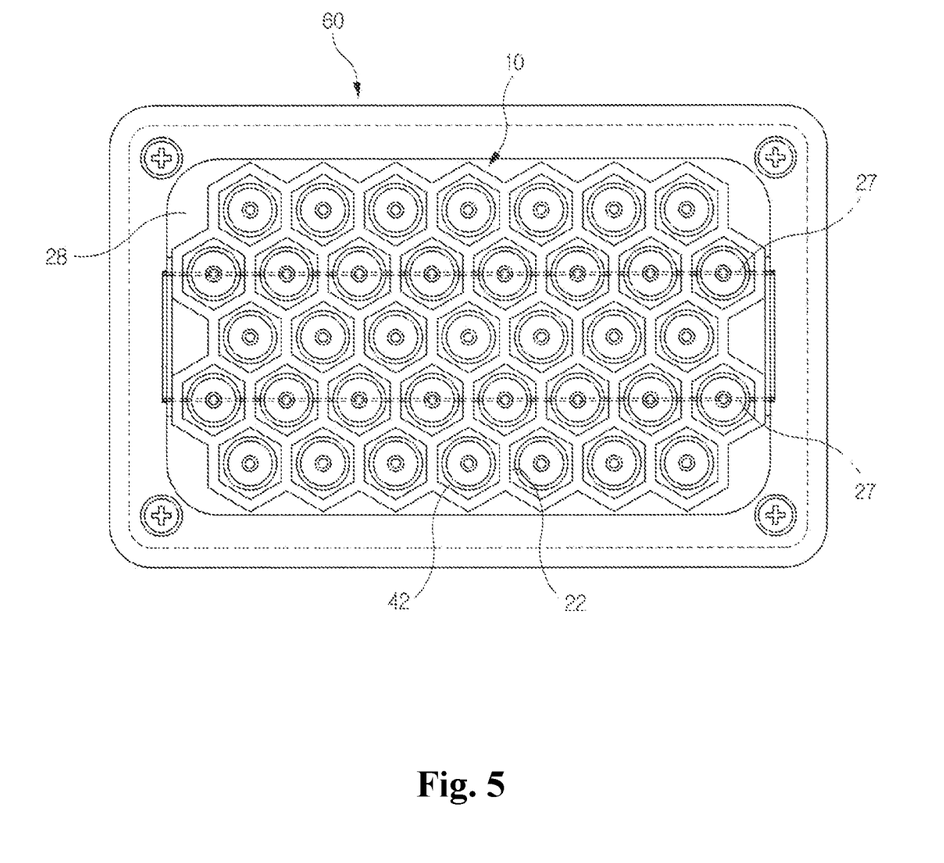
FIG. 5 is a bottom view of FIG. 1.

Although the distance d1 is designed to prevent friction between the partition wall 22 and the spring 30 even in case of suctioning a product, friction may occur due to unexpected deformation caused by the flexibility of the partition wall 22. In order to prevent the friction, as illustrated in FIG. 4, an air-permeable pocket 31 may be provided, and the spring 30 may be disposed in the pocket 31 in an embodiment.

The control valve 40 is a pipeline flow control valve coupled to the lower end of the coil spring 30, which is disposed inside the suction cell 21 with an air passage d2 between the partition wall 22 and the control valve 40. Here, a lower portion of a pipeline 41 corresponds to a surface of a product. Specifically, an end of the control valve 40 does not protrude at least from the lower end 22a of the partition wall 22. In this embodiment, although the control valve 40 includes a small-sized suction pad 42 disposed on an end thereof, the embodiment of the present invention is not limited to the configuration. For example, the control valve 40 may be designed so that an outer diameter of the control valve 40 does not block the passage d2 in an initial state before operation regardless of any configuration.

Also, even when the control valve 40 includes the small-sized pad 42, the small-sized pad 42 is disposed inside the lower end 22a of the partition wall 22. For example, when the small-sized pad 42 protrudes further than the lower end 22a, the small-sized pad 42 contacting a product may have an unstable posture.

According to the present invention, an inner space of each of the cells 21 communicates with the outside through an exhaust hole 23 disposed thereabove. Also, the pipeline 41 of the control valve 40 is connected to the inner space of the cell 21 and then communicates with the outside through the exhaust hole 23. Thus, air in the cell 21 and air passing through the control valve 40 may be discharged to the outside through the exhaust hole 23 while a vacuum system operates. For reference, the flow control valve 40 used herein represents a valve for realizing a high vacuum level in a space between the valve 40 and a product by regulating a flow rate using the pipeline 41 having a narrow diameter in comparison with an inner diameter of each of the suction cell 21 and the exhaust hole 23.

Particularly, the pad part 20 may include a core part 25 integrated on an upper side of the partition part 24 including a plurality of partition walls 22, and the exhaust hole 23 of the suction cell 21 may extend through the core part 25. Here, a pipeline stopper 26 for supporting an upper end of the spring 30 may be installed in an extended hole of the core part 25.

In terms of a structure, the spring 30 is disposed in the suction cell 21, upper and lower ends of the spring 30 are supported and fixed by the stopper 26 and the control valve 40, respectively, and the spring 30 is stretched and contracted in a longitudinal direction in the cell 21. When a surface of a product is significantly curved instead of being flat as indicated by a reference symbol 'W' of FIG. 6, wanted suction may not be smoothly performed. Thus, a height and a posture of a lower end of the control valve 40 may require sufficient flexibility, and the spring 30 may be selected in consideration of this feature.

In this embodiment, the suction pad 10 of the present invention further includes a tension wire 27 passing through each partition wall 22 and the control valve 40 in a transverse direction. The wire 24 has a shape variable in correspondence to elevation of a tube 30 and the partition wall according to a surface shape of a product to apply a predetermined pressure. Preferably, the wire 27 may be a synthetic fiber wire.

Gripper 50

The gripper 50 of the present invention includes the above-described suction pad 10 and the body 60 coupled to the suction pad 10 while covering an upper portion of the suction pad 10.

Here, the body 60 includes an inner vacuum chamber 61 communicating with the exhaust hole 23 of each cell 21 in a many-to-one manner and an exhaust port 62 connected with the chamber 61. That is, inner air of each of the suction cell 21 and the control valve 40 is suctioned to the vacuum chamber 61 through the exhaust hole 23 and discharged through the exhaust port 62 while the system operates. Thus, the gripper 50 may have an overall compact configuration and be easily connected with other devices of the vacuum transfer system, e.g., a vacuum pump.

Specifically, the body 60 is coupled with the core part 25 disposed at an upper side of the pad part 20. To this end, the core part 25 includes a hook part 28 protruding from an edge thereof in a transverse direction, and the hook part 28 is coupled with the body 60 by using a bolt to constitute the gripper 50.

In the gripper 50, in terms of a flow of air, components has a communication relationship such that "the lower end of the partition wall 22 and the air passage d2—the control valve 40—the suction cell 21—the exhaust hole 23—the stopper 26—the vacuum chamber 61—the exhaust port 62". A reference numeral 63 indicates a plate for pressing a top surface of the suction pad 10 and preventing the suction pad 10 from moving, and this plate 62 does not interrupt the above-described communication relationship.

Suction

Figure 6:
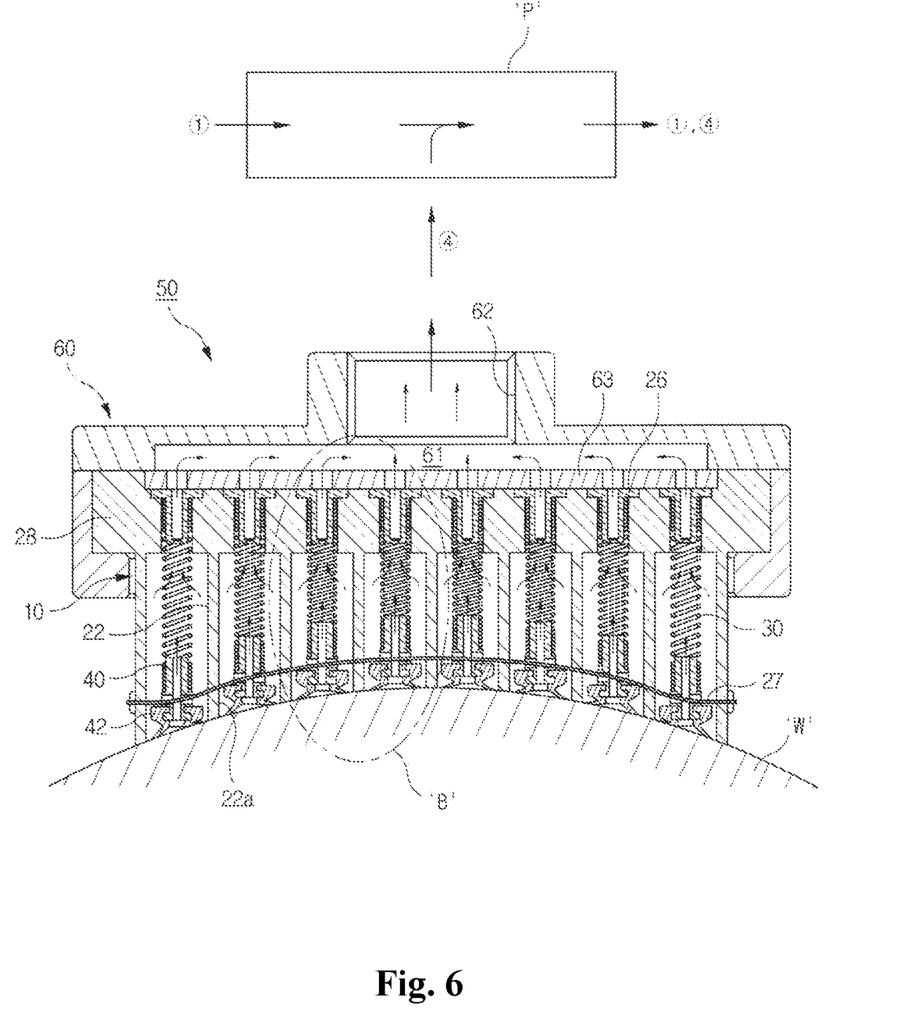
FIG. 6 is a cross-sectional view illustrating an operation of the vacuum gripper according to the present invention.
Figure 7:
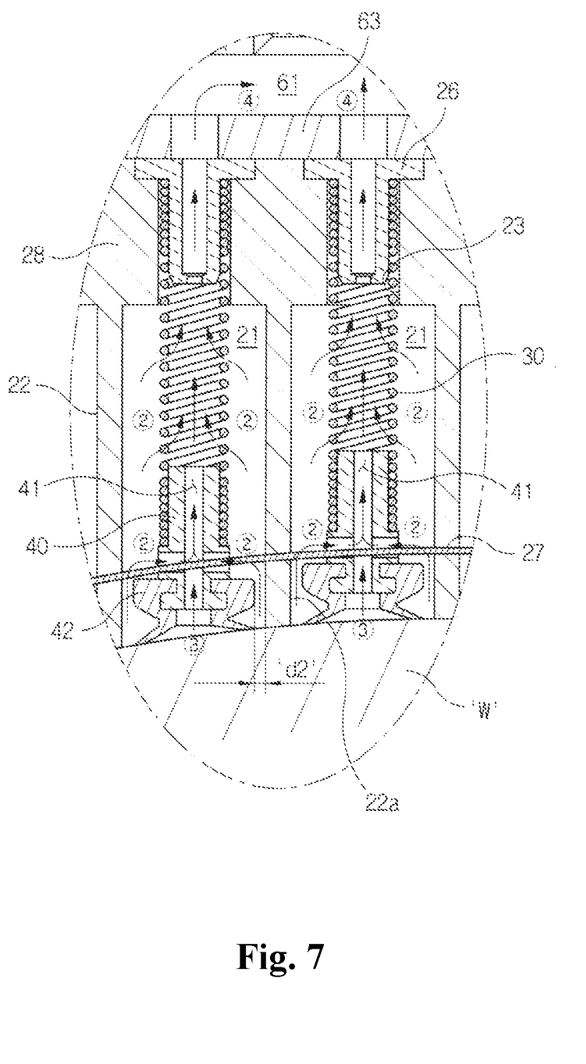
FIG. 7 is an enlarged view of a portion 'B' of FIG. 6.

Referring to FIGS. 6 and 7, a separately provided vacuum pump P is connected to the exhaust port 62 of the gripper 50 to constitute the vacuum transfer system, and the suction pad 10 is disposed so that the lower end 22a of each of the partition walls 22 and the lower end of the control valve 40 are contracted, deformed, and elevated in correspondence to a curved product W. In this state, when compressed air passes through the vacuum pump P at a high speed (refer to an arrow ①), the suction cell 21 and the control valve 40 provide a suction force to the product W.

Firstly, the inner air of the lower end 22a of the partition wall 22 is arrived at the suction cell 21 through the air passage d2, the inner air of the suction cell 21 passes through the upper exhaust hole 23 (refer to an arrow ②), introduced into the vacuum pump P through the vacuum chamber 61 and the exhaust port 62 (refer to an arrow ④), and then discharged to the outside together with the compressed air. In this process, as a vacuum and a negative pressure are generated in the suction cell 21, first-suction to the product W is performed at the lower end 22a of the partition wall 22 of the cell 21.

At the same tine, the inner air of the pipeline 41 of the control valve 40 passes through the inside of the cell 21 and the exhaust hole 23 (refer to an arrow ③), is introduced into the vacuum pump P through the vacuum chamber 61 and the exhaust port 62 (refer to an arrow ④), and then discharged to the outside together with the compressed air. In this process, as a vacuum and a negative pressure are generated in the small-sized pad 42 and the pipeline 41 of the control valve 40, second-suction to the product W is performed at a lower end of the pipeline 41.

As described above, the first-suction and the second-suction may be generated at the same time, and the inner space of the suction cell 21 may be exhausted at once to quickly perform suctioning and gripping of the product. In this state, when a vacuum pressure in the suction cell 21 increases, the air passage d2 may be closed as the flexible partition wall 22 is deformed.

Figure 8:
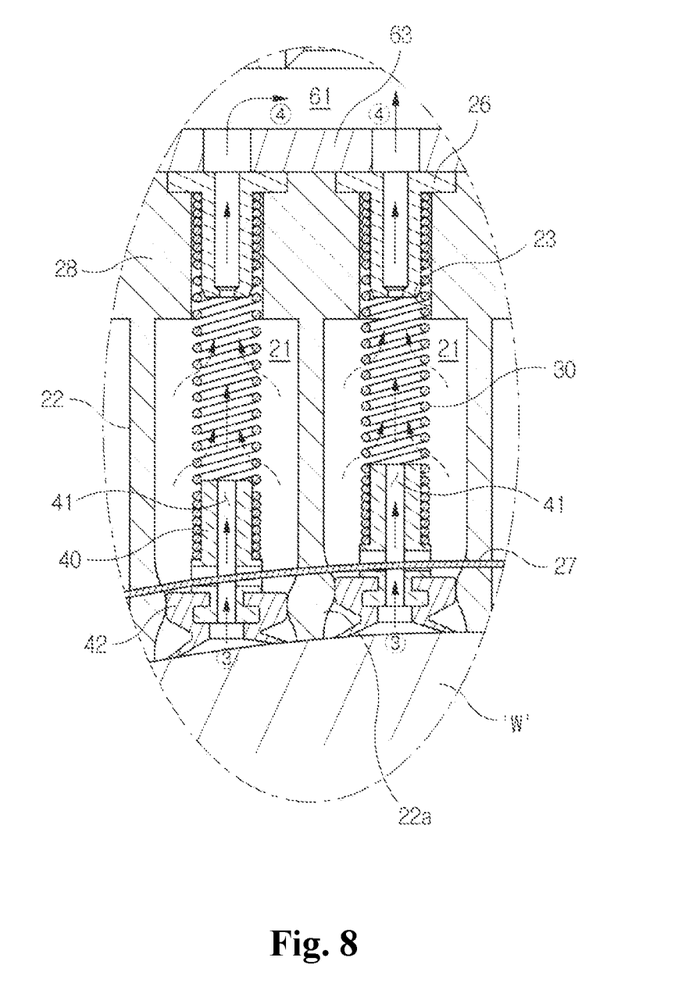
FIG. 8 is a view illustrating a state deformed from that of FIG. 7.

Referring to FIG. 8, when the first and second suctions are performed, and the vacuum and the negative pressure is sufficiently generated in the cell 21, the air passage d2 may be closed by the deformation of the partition wall 22. Even in this case, the first and second suctions are normally performed because the first-suction generated in a space of the lower end 22a of the partition wall 22 is maintained as it is, and the second-suction caused by the exhaustion of the inside of the pipeline 41 (refer to an arrow ③) is still performed. Thus, the product W may be quickly and completely suctioned through the first-suction and the second-suction.

Although vacuum leakage is generated in the space of the lower end 22a of the partition wall 22, the inner vacuum level of the cell is not significantly dropped by the exhaustion (refer to an arrow ③) caused by the second-suction. For example, when a leakage amount increases, since the passage d2 is opened to perform the exhaustion and the suction again as in FIG. 7, the first and second suctions may be instantly restored to a normal state.

The product W is gripped by using a suction force generated as described above and then transferred by using a device such as a robot arm. Also, after the product W is transferred to a predetermined position, all suction forces are released as supply of the compressed air is stopped, the product W is separated from the suction pad 10, and the partition wall 22 and the control valve 40 are returned to an original shape and an original position for preparing a next work.

Also, as the wire 27 slightly presses the partition wall 22 and the control valve 40 toward the product W when the suction force is applied or released, a close contact force and a suction force to the product of the partition wall 22 and the control valve 40 may be improved when the suction force is applied, and separation of the product W and the returning to the original shape and the original position of the partition wall 22 and the control valve 40 may be quickly performed when the suction force is released.

DESCRIPTION OF REFERENCE NUMERALS

10: Suction pad
20: Pad part
21: Suction cell
22: Partition wall 22a: Lower end
23: Exhaust hole
24: Partition wall part
25: Core part
26: Stopper
27: Wire
28: Hook part
30: Spring
40: Control valve
41: Pipeline
42: Small-sized pad
50: Gripper
60: Body
61: Vacuum chamber
62: Exhaust port
63: Plate
d1: Distance
d2: Air passage
P: Vacuum pump
W: Product

The invention claimed is:

1. A vacuum suction pad in which a plurality of suction cells (21) are consecutively disposed with a flexible partition wall (22) therebetween, the vacuum suction pad comprising:
 a flexible pad part (20) in which a lower end (22a) of the partition wall (22) at an opened side of the suction cell (21) is in contact with a surface of a product;
 a coil spring (30) that is coaxially installed at a central portion in a longitudinal direction in each of the cells (21) and spaced a distance (d1) from the partition wall (22); and a pipeline flow control valve (40) coupled to a lower end of the spring (30) and disposed in the suction cell (21) with an air passage (d2) defined between the partition wall (22) and the control valve (40), wherein a lower portion of a pipeline (41) corresponds to a surface of a product, wherein an inner space of each of the cells communicates with the outside through an exhaust hole disposed above the inner space.

2. The vacuum suction pad of claim 1, wherein the pad part (20) comprises a core part (25) integrated on an upper side of the partition wall part (24) comprising a plurality of partition walls (22), and an exhaust hole (23) of the suction cell (21) extends through the core part (25).

3. The vacuum suction pad of claim 2, wherein a stopper (26) configured to support an end of the spring (30) is installed in the extended hole of the core part (25).

4. The vacuum suction pad of claim 1, wherein the control valve (40) comprises a small-sized suction pad (42) disposed on an end of the control valve (40).

5. The vacuum suction pad of claim 1, wherein the suction pad (10) further comprises a tension wire (27) installed to pass through each of the partition walls (22) and the control valve (40) in a transverse direction.

6. The vacuum suction pad of claim 1, wherein an end of the control valve (40) is disposed inside the lower end (22a) of the partition wall (22) instead of at least protruding from the lower end (22a).

7. A vacuum gripper comprising:

a suction pad (10) in which a plurality of suction cells (21) are consecutively disposed with a flexible partition wall (22) therebetween, the vacuum suction pad comprising a flexible pad part (20) in which a lower end (22a) of the partition wall (22) at an opened side of the suction cell (21) is in contact with a surface of a product, a coil spring (30) that is coaxially installed at a central portion in a longitudinal direction in each of the cells (21) and spaced a distance (d1) from the partition wall (22), and a pipeline flow control valve (40) coupled to a lower end of the spring (30) and disposed in the suction cell (21) with an air passage (d2) defined between the partition wall (22) and the control valve (40), wherein a lower portion of a pipeline (41) corresponds to a surface of a product, wherein an inner space of each of the cells communicates with the outside through an exhaust hole disposed above the inner space; and a body (60) coupled to an upper side of the suction pad (10), wherein the body (60) comprises an inner vacuum chamber (61) configured to communicate with each of the suction cells (21) and the exhaust hole (23); and an exhaust port (62) configured to communicate with the chamber (61).

8. The vacuum gripper of claim 7, wherein the body (60) is coupled with a core part (25) integrated on an upper side of a partition wall part (24) comprising a plurality of partition walls (22).

* * * * *